US009852400B2

United States Patent
Ruan et al.

(10) Patent No.: US 9,852,400 B2
(45) Date of Patent: Dec. 26, 2017

(54) SYSTEM AND METHOD FOR DETECTING QUITTING INTENTION BASED ON ELECTRONIC-COMMUNICATION DYNAMICS

(71) Applicant: Palo Alto Research Center Incorporated, Palo Alto, CA (US)

(72) Inventors: Yiye Ruan, Columbus, OH (US); Jianqiang Shen, Santa Clara, CA (US); Oliver Brdiczka, Mountain View, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 727 days.

(21) Appl. No.: 13/875,149

(22) Filed: May 1, 2013

(65) Prior Publication Data
US 2014/0344174 A1     Nov. 20, 2014

(51) Int. Cl.
G06F 17/20 (2006.01)
G06F 17/27 (2006.01)
(Continued)

(52) U.S. Cl.
CPC ....... G06Q 10/105 (2013.01); G06F 17/2785 (2013.01); G06Q 10/04 (2013.01);
(Continued)

(58) Field of Classification Search
USPC ..................... 705/7.29, 7.36, 7.37
See application file for complete search history.

(56) References Cited

U.S. PATENT DOCUMENTS 8,077,951 B2   12/2011   Delenstarr
2002/0099594 A1*  7/2002  Heard .................. G06Q 30/02
                                                    706/12
(Continued)

OTHER PUBLICATIONS

Lange, Kathy. Text Analytics: Two World Collide. analytics-magazine.org. Jun. 2010. [Retrieved on: Apr. 6, 2016]. Retrieved from internet:  <URL:http://www.analytics-magazine.org/may-june-2010/140-text-analytics-two-world-collide>. entire document.*

*Primary Examiner* — Lynda Jasmin
*Assistant Examiner* — Tamara Griffin
(74) *Attorney, Agent, or Firm* — Shun Yao; Park, Vaughan, Fleming & Dowler LLP

(57) ABSTRACT

A quitting-intention estimating system facilitates detecting an entity's intention to quit an organization. During operation, the system obtains recent electronic-communication information associated with the entity under investigation, such as an employee of a corporation, or a volunteer of a non-profit organization. The system can determine the entity's quitting intention by determining a plurality of recent communication features from the electronic-communication information, for example, by using a variety of feature-extracting modules that extract the features from the entity's electronic communications. The system then computes a quitting-intention value for the entity under investigation, using a quitting-intention estimating function that takes the recent communication features as input. The quitting-intention estimating function detects a change in the entity's behavior from previous communication features, and generates a quitting-intention value which indicates a likelihood that the change in the entity's behavior corresponds to an intention to quit the organization.

21 Claims, 8 Drawing Sheets

(51) Int. Cl.
*G06F 17/28* (2006.01)
*G06Q 10/00* (2012.01)
*G06Q 10/10* (2012.01)
*G06Q 10/06* (2012.01)
*G06Q 10/04* (2012.01)

(52) U.S. Cl.
CPC ....... *G06Q 10/0635* (2013.01); *G06Q 10/107* (2013.01); *G06Q 10/1053* (2013.01); *G06F 17/2715* (2013.01)

(56) References Cited

U.S. PATENT DOCUMENTS

| | | | |
|---|---|---|---|
| 2004/0039548 A1 | 2/2004 | Selby | |
| 2004/0049478 A1* | 3/2004 | Jasper | G06F 17/30705 |
| 2006/0085155 A1 | 4/2006 | Miguelanez | |
| 2007/0033188 A1* | 2/2007 | Levy | G06F 17/30722 |
| 2007/0055477 A1 | 3/2007 | Chickering | |
| 2007/0219741 A1 | 9/2007 | Miguelanez | |
| 2007/0244741 A1* | 10/2007 | Blume | G06Q 30/02 705/7.31 |
| 2008/0084972 A1* | 4/2008 | Burke | G06Q 10/107 379/88.02 |
| 2008/0209229 A1* | 8/2008 | Ramakrishnan | G06F 17/30032 713/186 |
| 2009/0157714 A1* | 6/2009 | Stanton | G06F 17/30613 |
| 2009/0276289 A1* | 11/2009 | Dickinson | G06Q 10/063 705/7.29 |
| 2010/0030544 A1 | 2/2010 | Gopalan | |
| 2010/0114654 A1* | 5/2010 | Lukose | G06Q 30/0256 705/14.54 |
| 2010/0174813 A1* | 7/2010 | Hildreth | G06F 17/30943 709/224 |
| 2010/0287111 A1* | 11/2010 | Scarborough | G06Q 10/063 705/321 |
| 2011/0022354 A1 | 1/2011 | Kumar | |
| 2011/0047404 A1* | 2/2011 | Metzler | G06F 19/322 714/2 |
| 2011/0289025 A1* | 11/2011 | Yan | G06N 99/005 706/12 |
| 2011/0307303 A1* | 12/2011 | Dutta | G06F 17/30539 705/7.42 |
| 2012/0011158 A1* | 1/2012 | Avner | G06F 17/2785 707/777 |
| 2012/0053990 A1* | 3/2012 | Pereg | G06Q 10/06 705/7.31 |
| 2012/0158572 A1* | 6/2012 | Dorai | G06Q 40/025 705/38 |
| 2012/0197835 A1* | 8/2012 | Costa | G06Q 10/1053 706/52 |
| 2013/0166358 A1* | 6/2013 | Parmar | G06Q 10/06393 705/7.39 |
| 2013/0231974 A1* | 9/2013 | Harris | G06Q 30/0201 705/7.29 |
| 2013/0268468 A1* | 10/2013 | Vijayaraghavan | G06N 99/005 706/12 |

* cited by examiner

SYSTEM AND METHOD FOR DETECTING QUITTING INTENTION BASED ON ELECTRONIC-COMMUNICATION DYNAMICS

STATEMENT OF GOVERNMENT-FUNDED RESEARCH

This invention was made with Government support under Contract No. W911NF-11-C-0216 awarded by the Army Research Office. The Government has certain rights in this invention.

RELATED APPLICATIONS

The subject matter of this application is related to the subject matter of the following applications:
  U.S. patent application Ser. No. 13/663,747, entitled "METHOD AND SYSTEM FOR PSYCHOLOGICAL ANALYSIS BY FUSING MULTIPLE-VIEW PREDICTIONS," by inventors Jianqiang Shen and Oliver Brdiczka, filed 30 Oct. 2012; and
  U.S. patent application Ser. No. 13/660,959, entitled "METHOD AND SYSTEM FOR BUILDING AN ENTITY PROFILE FROM EMAIL ADDRESS AND NAME INFORMATION," by inventors Jianqiang Shen and Oliver Brdiczka, filed 25 Oct. 2012;
the disclosures of which are incorporated by reference in their entirety herein.

BACKGROUND

Field

This disclosure is generally related to artificial intelligence. More specifically, this disclosure is related to techniques for training and using a quitting-intention estimating system to estimate a likelihood that a given person intends to quit an organization.

Related Art

Companies and other organizations typically achieve their goals by recruiting and retaining a staff of skilled individuals that are highly-motivated to achieve the company's goals, and empowering these individuals with access to the organization's resources. Some individuals are trusted with managing one or more client accounts, making them the contact persons for doing business with these clients. Other individuals are allowed access to a company's valuable intellectual property, such as trade secrets, technical specifications to new product designs, or other sensitive information.

Unfortunately, it is common for a company to periodically lose valuable employees that have decided to quit. Some employees may decide to quit when they feel unchallenged by their current position, or when they lose faith in the company. Other employees may decide to quit when they are offered a more rewarding position elsewhere, such as a position with better pay, or with more challenging projects.

In many cases, these employees may not explicitly notify their supervisors of their intention to quit until they've secured their next employment position. However, in the mean time, these employees may complete enough work to maintain appearances with their current employer. It is possible that these employees may also change their day-to-day behavior while they remain in the company, but not enough for their supervisors or their colleagues to suspect their intention to quit the company. Hence, these employees become an unforeseen risk to the company, because they may quit at any time to join a competing organization, taking valuable clients and/or information with them. If the supervisor is not aware of an employee's intention to quit, the supervisor may continue to assign valuable projects to the employee, and may continue to allow the employee access to sensitive information that should not be leaked to other competing organizations.

SUMMARY

One embodiment provides a quitting-intention estimating system that detects an entity's intention to quit an organization. During operation, the system obtains recent electronic-communication information associated with the entity under investigation, such as an employee of a corporation, or a volunteer of a non-profit organization. The system can determine the entity's quitting intention by determining a plurality of recent communication features from the electronic-communication information, for example, by using a variety of feature-extracting modules that extract the features from the entity's electronic communications. The system then computes a quitting-intention value for the entity under investigation, using a quitting-intention estimating function that takes the recent communication features as input. The quitting-intention estimating function detects a change in the entity's behavior from previous communication features, and generates a quitting-intention value which indicates a likelihood that the change in the entity's behavior corresponds to an intention to quit the organization.

In some embodiments, the entity under investigation includes one or more of: an employee of the organization; a group of employees within the organization; and a department within the organization.

In some embodiments, the quitting-intention estimating function implements a Markov process to compute the quitting intention, $Q_t$, and has the form:

$$Q_t \propto p(Q_t | Q_{t-1}, Q_{t+1}, f).$$

Here, t indicates a recent time interval associated with the recent communication features, t−1 indicates a preceding time interval associated with the previous communication features, $f_t$ indicates the recent communication features, and $Q_{t-1}$ indicates a quitting-intention value for the preceding time interval.

In some embodiments, the system can train the quitting-intention estimating function as a pre-processing operation, or during runtime. To train the quitting-intention estimating function, the system determines a first group of entities that have belonged to the organization, and determines a second group of entities that have quit the organization. The system then determines electronic-communication information associated with the first and second groups, and trains one or more parameters of the quitting-intention estimating function based on the electronic-communication information. For example, the system can train the quitting-intention estimating function to maximize the quitting-intention values for the second group of entities that have quit the organization.

In some variations to these embodiments, the one or more parameters include a mean-feature value, $\mu$, for a given communication feature. Further, while training the one or more parameters, the system determines feature values for the first group of entities that have belonged to the organization, for the plurality of time intervals. The system then computes the mean-feature value, μ, for the communication feature, as a mean of the determined feature values for the first group.

In some variations to these embodiments, the one or more parameters includes a feature-control value, λ, which indicates a deviation from the mean-feature value for entities that have quit the organization. While training the one or more parameters, the system determines feature values for the communication feature, for the second group of entities that have quit the organization, for the plurality of time intervals. The system uses these feature values to compute a mean value, μ', for the second group. The system then computes the feature-control value, λ, for the communication feature, as the difference between the mean feature values for the first and second groups (e.g., the difference between mean values μ and μ').

In some variations to these embodiments, the one or more parameters includes a feature-variance value, Σ, which indicates a magnitude by which feature values for the communication feature are expected to vary from μ across a plurality of time intervals.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a quitting-intention estimating system that solves the problem of estimating a person or group's intention to quit an organization. For example, a person that has just joined an organization may be highly motivated to succeed, and may not have an intention to quit. On the other hand, some employees that have recently been reprimanded for poor performance may have an increased intention to quit. It may be possible to encourage some of these employees to try harder and to stay with the organization. However, other employees may have a significantly high intention to quit, that they may become a security risk to the organization's intellectual property.

The quitting-intention estimating system can compute a score indicating an entity's intention to quit by analyzing the entity's electronic communication, and determining whether there is a change in the entity's communication pattern that has been known to correlate to a high quitting intention. Specifically, the system analyzes the electronic communication to extract features that can indicate the entity's intention to quit, and processes these features using a model that computes the quitting intention score.

In some embodiments, the entity can correspond to a group within a company, or can correspond to the company as a whole. Hence, by computing the quitting intention for the group or company, the system can estimate a level of morale for the group or throughout the company. This can help the company determine the effectiveness of a group's manager to motivate the group, and can warn the company of a systemic issue throughout the company.

Figure 1:
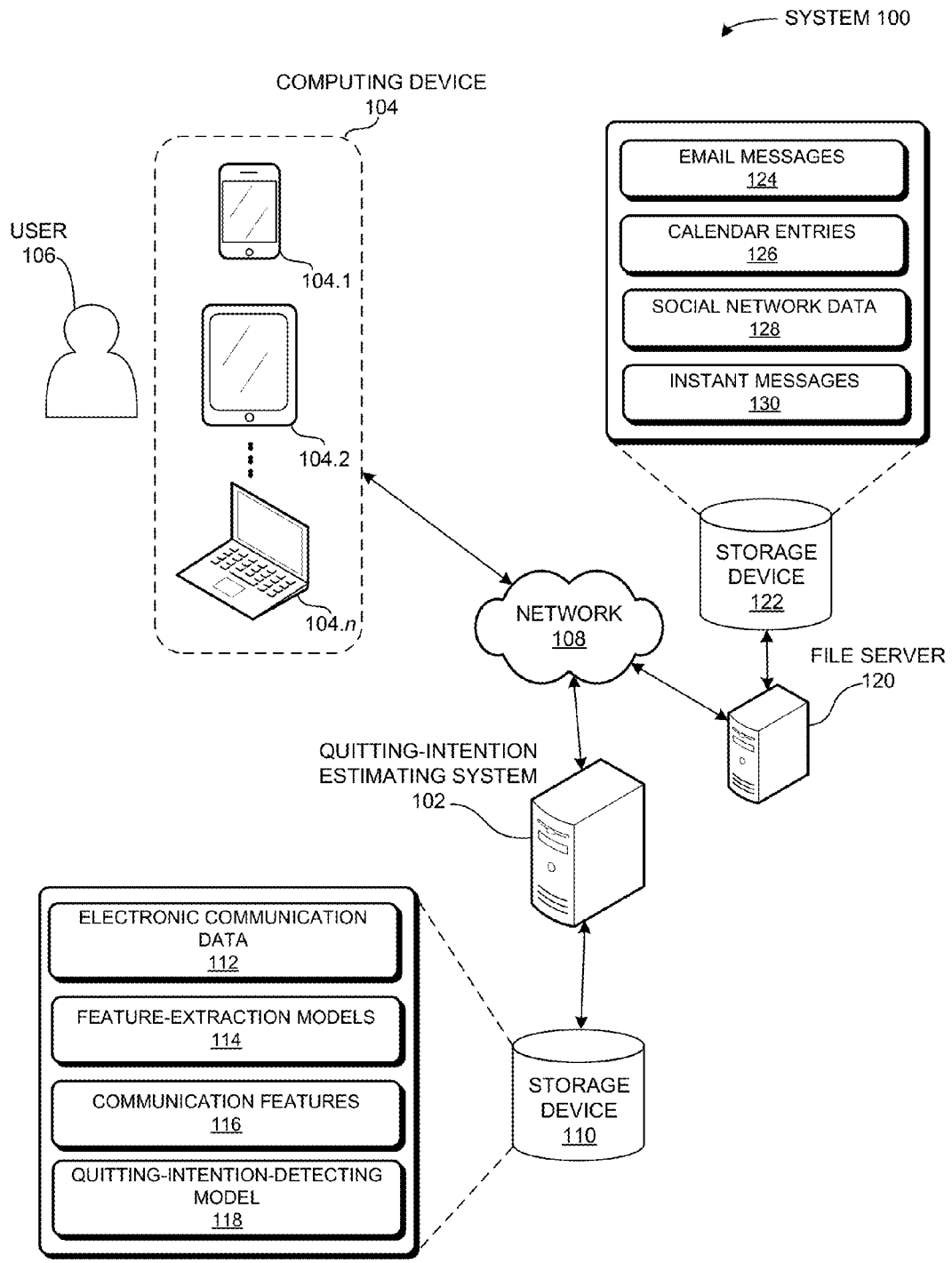
FIG. 1 illustrates an exemplary computing environment that facilitates estimating an entity's quitting intention in accordance with an embodiment.

FIG. 1 illustrates an exemplary computing environment 100 that facilitates estimating an entity's quitting intention in accordance with an embodiment. Computer system 100 can include a computing device 104 coupled to a network 108 and associated with a user 106, such as a portable computing device that user 106 can travel with, use to communicate with others, perform tasks, schedule meetings, and interact with an application server 120. For example, computing device 104 can include a smartphone 104.1, a tablet computer 104.2, or any other personal computing device 104.n such as a laptop computer, a desktop computer, etc. Also, computer network 108 can include any wired or wireless network that interfaces various computing devices to each other, such as a computer network implemented via one or more technologies (e.g., Wi-Fi, cellular, Ethernet, fiber-optic, Bluetooth, etc.).

In some embodiments, application server 120 can obtain and store electronic-communication information that is generated by, or associated with, a plurality of users, such as user 106. Specifically, application server 120 can host one or more services that allow users to generate electronic-communication content. These services can include an email-hosting service, a calendar-hosting service, or an online social-media service. User 106 may use these services during his work day to perform work activities, as well as to communicate with his friends and colleagues, which can be used to gauge the user's satisfaction with his role in an organization, as well as to estimate a likelihood the user intends to quit the organization in the near future. If the user is satisfied with the organization or his role in the organization, the user is likely to be productive, and may communicate and interact often with his colleagues. On the other hand, if the user becomes dissatisfied, the user is likely to decrease his productivity, and/or may decrease the amount of communication and interaction with his colleagues (e.g., may decrease the quality and frequency of communication).

In some embodiments, computer system 100 also includes a quitting-intention estimating system 102, which analyzes electronic-communication data hosted by application server 120 to determine a quitting intention for user 106. Quitting-intention estimating system 102 can use historical electronic-communication information for a plurality of users to train a set of parameters that facilitate estimating a user's quitting intention. Quitting-intention estimating system 102 can also use recent electronic-communication information from user 106, along with the trained parameters, to compute a recent quitting-intention score for user 106.

In some embodiments, application server 120 can include or be coupled to a storage device 122 that stores the electronic-communication information for a plurality of users. For example, an email and calendar service hosted by application server 120 can receive and store email messages 124 that were sent from or to user 106, and/or can host calendar entries 126 for events to which user 106 is a participant. Also, the online social media service hosted by application server 120 can include an an instant-messaging service, such as Google chat, America On-Line (AOL) Instant Messenger (AIM), which facilitates user 106 to exchange direct instant messages with other user users through an instant-messaging client. Storage device 122 can store instant messages 130, which include direct instant messages sent or received by user 106.

In some other embodiments, the online social media service can also include an online social network, such as Facebook, LinkedIn, or an organization's internal online social network. Storage device 122 can store social-network data 128, which includes user-generated content, which was generated by user 106, or which was generated by other users that user 106 has indicated to be "friends" with. For example, the online social network can include a message board, or "wall," for each member of the service, to which the member or his "friends" can post messages. Social-network data 128 can include any messages posted by user 106 on his message board or on any other member's message board, and can also include messages posted on the message board for user 106 by any other user. Social-network data 128 can also include direct messages exchanged between user 106 and any other user of the online social network.

Figure 2:
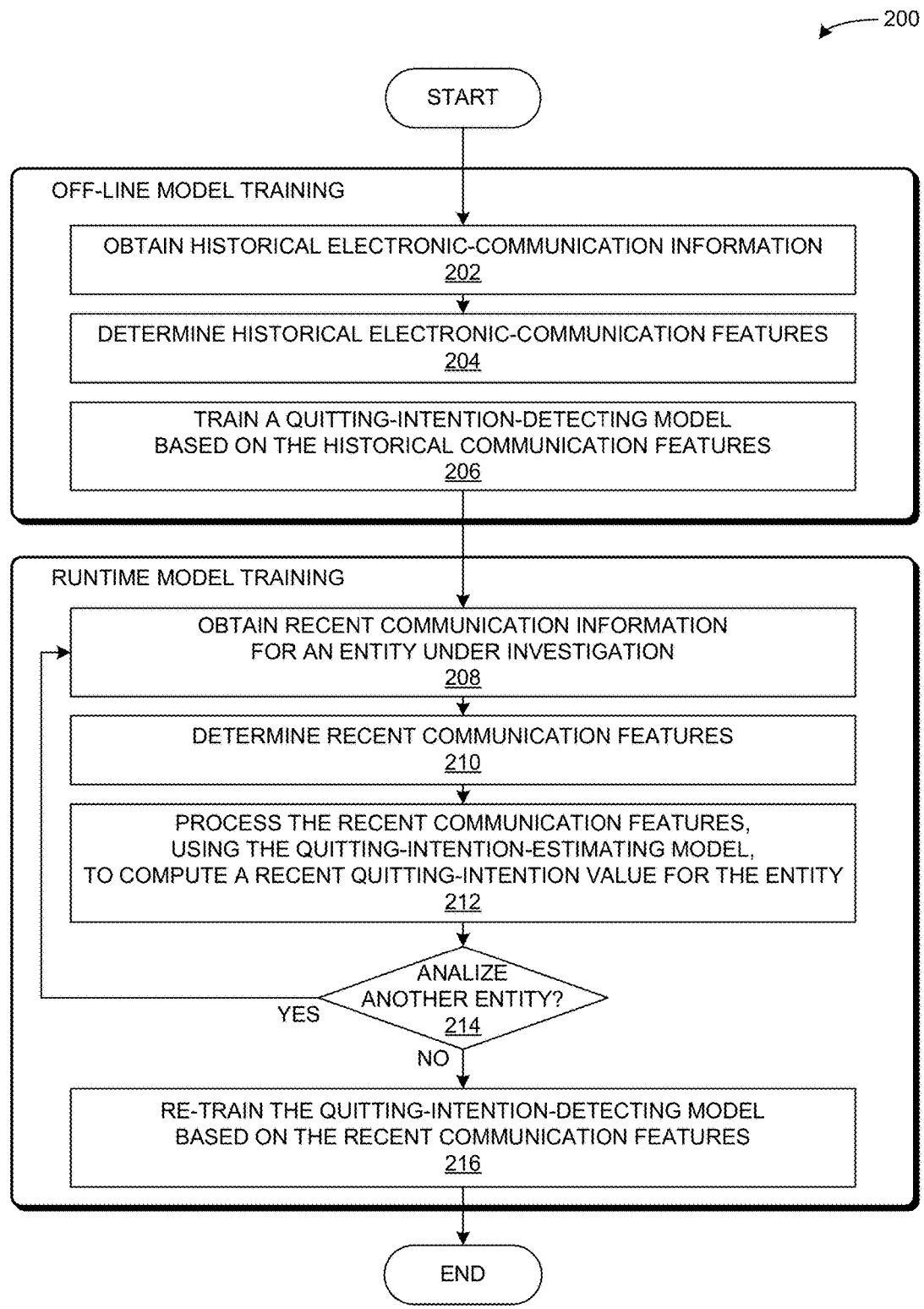
FIG. 2 presents a flow chart illustrating a method for training and using a quitting-intention estimating model to estimate a quitting intention for an entity of an organization in accordance with an embodiment.

FIG. 2 presents a flow chart illustrating a method 200 for training and using a quitting-intention estimating model to estimate a quitting intention for an entity of an organization in accordance with an embodiment. During operation, the system can perform off-line model training by obtaining historical electronic-communication information associated with a plurality of entities associated with an organization (operation 202). Some of these entities may have already quit the organization, while others may still belong to the organization.

The system then determines historical entity-behavior features from these entities' communication information (operation 204), and trains a quitting-intention estimating model based on the historical features (operation 206). This communication information can include any electronic information that provides a message to the entity, or that provides a message from the entity to another entity. For example, the entity under investigation may communicate with others via an email account, an online-social network, a chat client, or via any other electronic means, such as a web log (blog) post.

The system can train the quitting-intention estimating model, for example, so that the model maximizes the quitting-intention value for entities that have quit the organization (e.g., resulting in a quitting-intention value that is equal to (or approximately equal to) one). The system can also train the model to minimize the quitting-intention value for entities that have recently joined the organization (e.g., resulting in a zero (or near-zero) quitting-intention value).

In some embodiments, the system can use the quitting-intention estimating module to compute an approximate quitting-intention value for any entity that belongs to the organization. The system can also periodically re-train the quitting-intention estimating model, using recent electronic-communication information associated with entities that belong to the organization. For example, the system can iteratively compute new quitting-intention values, and/or retrain the model, at a predetermined time interval (e.g., once per week).

During each iteration, to compute a new quitting-intention value for any given entity, the system first obtains electronic-communication that was generated by, received by, or otherwise associated with the entity during the recent time interval (operation 208). The system extracts communication features from this electronic communication (operation 210), and processes these features using the quitting-intention model to compute the new quitting-intention value for the recent time interval (operation 212). The system then determines if there are other entities for which to compute a new quitting-intention value (operation 214). If so, the system returns to operation 208 to compute the quitting-intention score for this entity. Otherwise, if no more entities remain, the system can re-train the quitting-intention estimating model using the recent features for a plurality of entities associated with the organization (operation 216).

Figure 3:
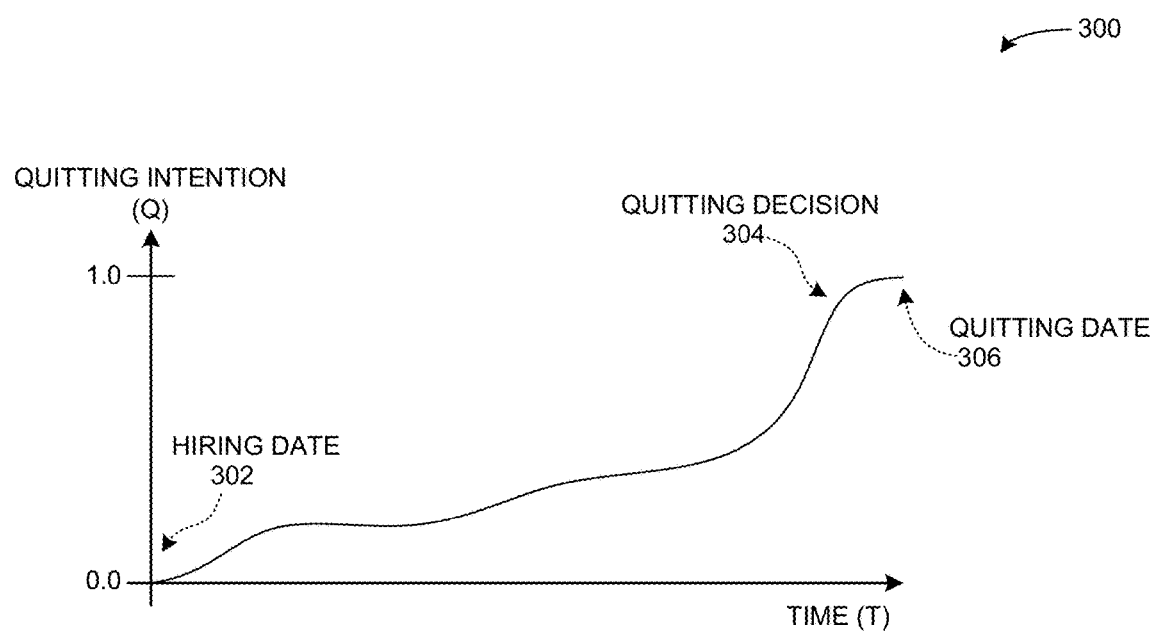
FIG. 3 presents an exemplary graph illustrating a change in the entity's quitting intention over time in accordance with an embodiment.

FIG. 3 presents an exemplary graph 300 illustrating a change in the entity's quitting intention over time in accordance with an embodiment. Specifically, graph 300 includes a horizontal axis that spans a set of time intervals, and includes a vertical axis that corresponds to an entity's quitting intention, Q. When the entity joins the organization, it is expected that the entity does not intend to quit immediately. This is illustrated by hiring date 302 of graph 300, where the entity's quitting intention is at it's all-time low, with a value of 0.0. Also, when an entity quits an organization, the entity may have been dissatisfied by the organization, his role in the organization, or may have been more interested in outside opportunities. This is illustrated by the steep slope at quitting decision 304, and by the high plateau with a value of 1.0 at quitting date 306.

In some embodiments, as an employee works with the organization over time, his quitting intention may change based on his sentiments with the organization at each point in time. Sometimes he may feel good about the projects he's working on, or may have good camaraderie with his colleagues, which can result in a decrease in his quitting intention. At other times, the employee may not feel as excited about the organization, or his role in the organization, so his quitting intention may fall at these times. The employee's quitting intention may also rise or fall due to outside circumstances, such as changes in his personal life (e.g., marriage, starting a family), or due to other goals, interests, or job offers that have captured his attention. In any case, these sentiment influencers can cause the entity's quitting intention to rise or fall, which are reflected by the change in slopes across graph 300.

Oftentimes, because the employee's quitting intention is influenced by his sentiments, the employee may reflect these sentiments in how he communicates with others in the organization. For example, an employee with a decreasing quitting intention may reflect his increasing satisfaction in the organization by communicating more often with his peers, by using a more detailed writing style and words with an increased sentiment. On the other hand, an employee with an increasing quitting intention may decide to only communicate when necessary, and may write more concise emails that do not convey camaraderie with certain colleagues, as his interest in the organization may be decreasing.

Table 1 presents exemplary features that can be extracted from an entity's electronic-communication in accordance with an embodiment. Specifically, the extracted features can correspond to one or more of the following four feature categories: word statistics; writing style; speech act taxonomy; and work practice. For example, the "positive sentiment feature" indicates a number of times, or frequency, at which the entity uses words with a positive sentiment in his electronic communication, and/or can indicate a percentage of the entity's electronic communications that indicate a positive sentiment.

The word statistics category includes features that count a number or frequency at which words from a given word category used by the entity in his electronic communication, or that count a percentage of communication items that include words of the given word category. The writing style category includes features that indicate a number or frequency at which a pre-determined pattern is detected in the entity's electronic communication, or that indicate a percentage of communication items that include the pre-determined pattern. The speech act taxonomy category includes features that count a number or frequency for words or phrases that request or otherwise indicate an upcoming action, such as a collaboration with other entities in the organization. The speech act taxonomy features can also indicate a percentage of document that include words or phrases of this category.

TABLE 1

Exemplary Features Types

| Feature Category | Exemplary Features |
|---|---|
| Word Statistics: | Part of speech: number of nouns, verbs, adjectives, etc.<br>Sentiment: number of positive-sentiment words, negative-sentiment words, and neutral-sentiment words<br>Subjectivity: number of strongly-subjective words, number of weakly-subjective words<br>Pronoun usage: number and/or frequency of use<br>Negation usage: number and/or frequency of use<br>Number of long (complex) words<br>Number of rare (difficult) words |
| Writing Style: | Writing pattern for a message greeting<br>Writing pattern for closing an email message<br>Writing patterns that include "wishes"<br>Pattern of including emoticons (e.g., smiley faces) |
| Speech act taxonomy: | Deliver<br>Request<br>Commit<br>Propose<br>Meeting<br>Date |
| Work practice: | Number of communications (sent, received)<br>Number of friends in communications (sent, received)<br>Number of after-hour communication activities<br>Number of communication activities on an internal account<br>Number of friends internal to the organization<br>Communication-network features: weighted degree, clustering coefficients, entropy, etc. |

The work-practice category includes features which count a number or frequency of work-related actions performed by the entity, as determined by the entity's electronic communications. The work-practice category can also include "communication-network" features, which describe network topology features for the entity based on an active-communication graph. For example, the system can periodically generate the active-communication graph based on electronic-communication information for a plurality of entities in the organization. This electronic-communication information can include any messages sent and/or received by these entities during the given time interval (e.g., the past week), or during a window of multiple time intervals (e.g., during the past four weeks).

The system can create a graph link between two entities when the two entities have exchanged a message (e.g., one is the sender and the other entity is the recipient), or in some embodiments, when the two recipients are mentioned in the message (e.g., both entities are recipients, and/or are mentioned in the message body). Also, in some embodiments, each link may be a weighted link, such that the weight of each link correlates to a number of electronic messages that mention the two entities (e.g., the system can increase the weight of each link for each message that mentions the two entities). Then, once the system has generated the active-communication graph, the system can compute key network-related characteristics for an entity, based on the entity's graph. These network-related characteristics can include weighted degree, a clustering coefficient, entropy, etc.

Figure 4A:
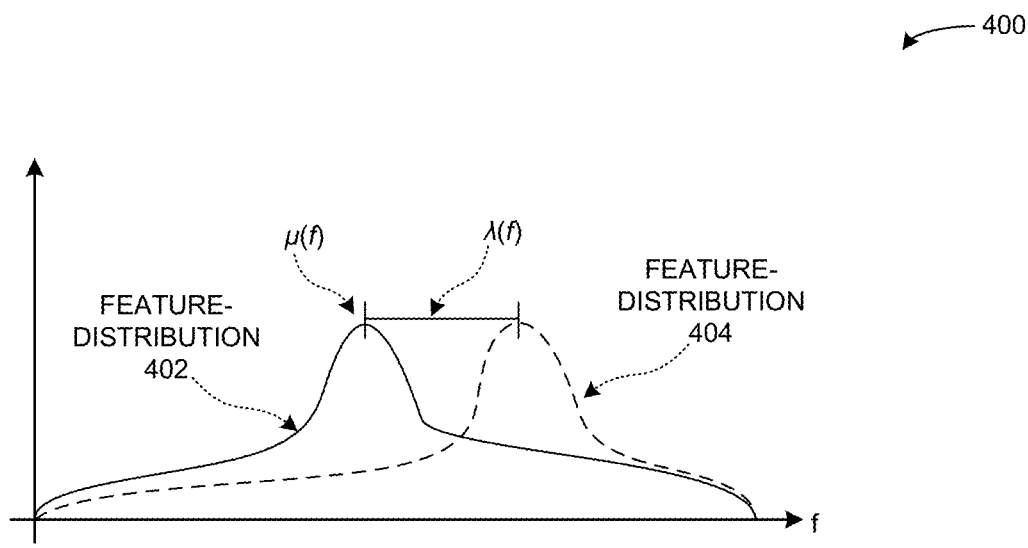
FIG. 4A presents a graph illustrating a distribution of feature values for entities that have belonged to an organization in accordance with an embodiment.

FIG. 4A presents a graph 400 illustrating a distribution of feature values for entities that have belonged to an organization in accordance with an embodiment. Specifically, graph 400 includes a feature-distribution 402 for a feature f, such that feature-distribution 402 indicates feature values for entities that have belonged to an organization. These entities can include people that currently belong to the organization, and people that have resigned from the organization. In some embodiments, feature-distribution 402 can resemble a Gaussian distribution, with a mean value $\mu(f)$.

Graph 400 also includes a feature-distribution 404 for feature f, comprising feature values for entities that have resigned from the organization. Feature-distribution 404 can include a mean value 406, such as at a peak of a Gaussian distribution. Notice the shift between mean value $\mu(f)$ and mean value 406. This shift indicates that entities which have quit in the past have also had a significantly higher feature value for feature f. Hence, feature f provides a reliable source of information for estimating an entity's quitting intention.

However, in general, mean value 404 (e.g., for entities that have quit) can vary across different feature types. Some feature types can have a mean value that is less than $\mu(f)$, and/or can have a shift from $\mu(f)$ that is either greater than or less than $\lambda(f)$ in magnitude.

Figure 4B:
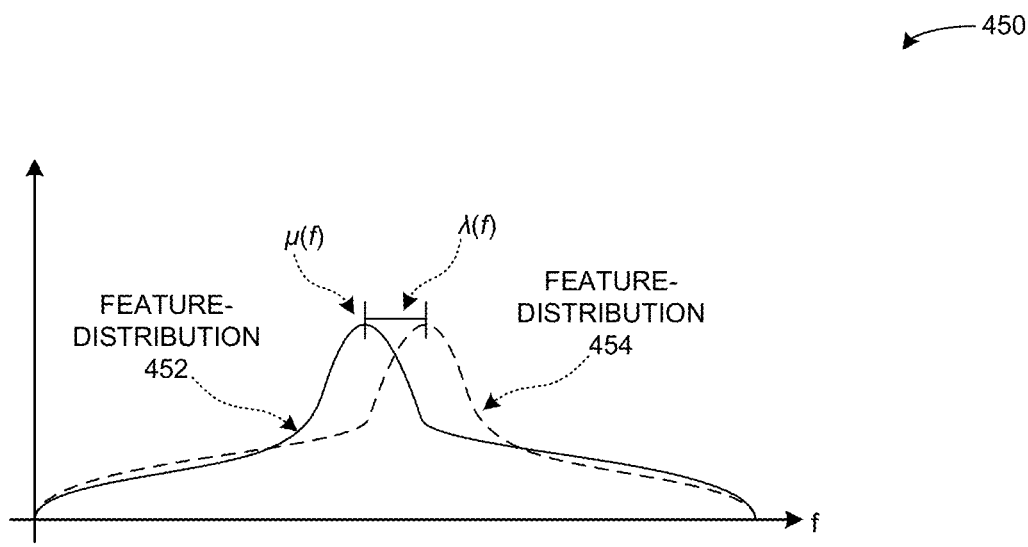
FIG. 4B presents a graph illustrating a distribution of feature values for entities that have belonged to an organization in accordance with an embodiment.

FIG. 4B presents a graph 450 illustrating a distribution of feature values for entities that have belonged to an organization in accordance with an embodiment. Specifically, graph 450 includes a feature-distribution 452 for a feature g, comprising feature values for entities that have belonged to the organization, with a mean value $\mu(g)$. Graph 450 also includes a feature-distribution 454 for feature g, comprising feature values for entities that have quit the organization. Notice that $\lambda(g)$ for feature g is not significantly large, as the Gaussian distributions for feature-distributions 452 and 454 overlap significantly. Hence, feature g does not provide a significantly reliable source of information for estimating an entity's quitting intention.

In some embodiments, the system uses λ(f) as a control value, to control an amount by which a shift in an entity's feature values for feature f influences the entity's quitting-intention score.

Figure 5:
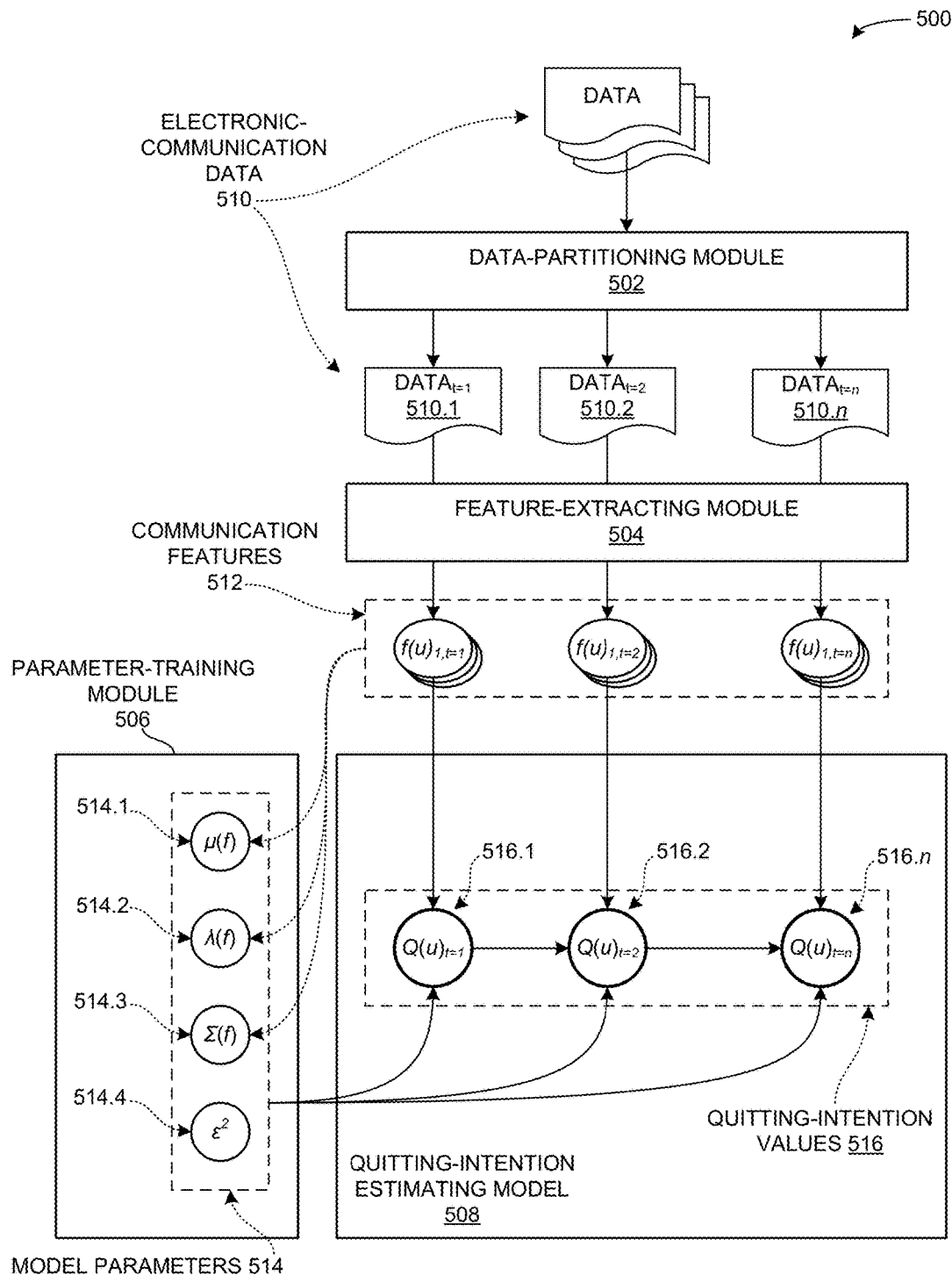
FIG. 5 presents exemplary computations performed by a quitting-intention estimating system in accordance with an embodiment.

FIG. 5 presents exemplary computations performed by a quitting-intention estimating system 500 in accordance with an embodiment. System 500 can include a data-partitioning module 502, a feature-extracting module 504, a parameter-training module 506, and a quitting-intention estimating module 508.

During a training phase, data-partitioning module 502 can partition electronic-communication data 510 into a set of non-overlapping time intervals. In some embodiments, each piece of communication data has a corresponding timestamp, which is set to the time and date at which the piece of communication was created. Data-partitioning module 502 can use these timestamps to produce data 510.1 for a time interval t=1, data 510.2 for a time interval t=2, and data 510.n for a time interval t=n. Then, feature-extracting module 504 generates one or more communication feature values 512 for each entity u, and for each time interval in the set t∈[1, n]. For example, system 500 may have a set of m features models f∈[1, m]. At a time interval t=i, the system computes feature value $f(u)_{1,t=i}$ for feature $f_1$, computes feature value $f(u)_{2,t=i}$ for feature $f_2$, and computes feature value $f(u)_{m,t=i}$ for feature $f_m$.

Parameter-training module 506 uses communication features 512 to train a set of model parameters 514. Model parameters 514 can include a mean-feature value μ(f) 514.1, a feature-control value λ(f) 514.2, a feature variance Σ(f) 514.3, and a quitting-intention variance $\epsilon^2$ 514.4. Parameter-training module 506 can obtain quitting-intention variance 514.4 as an input parameter from the user. Further, parameter-training module 506 can compute mean-feature value 514.1, feature-control value 514.2, and feature variance 514.3 directly from communication features 508, using techniques described in detail with respect to FIG. 6.

Then, quitting-intention estimating module 508 can compute a set of quitting-intention values 516 (e.g., $Q(u)_{t=1}$, $Q(u)_{t=2}$, and $Q(u)_{t=n}$) for each entity u that has belonged to the organization. In some embodiments, quitting-intention estimating module 508 performs Gibbs sampling to compute quitting-intention values 516 across the set of time intervals. For example, quitting-intention estimating module 508 sets an entity's quitting intention $Q_1=0$ for the time interval when the entity joins the organization (e.g., t=1), sets quitting intention $Q_T=0$ for the current time interval (e.g., t=T) if the entity has not yet quit the organization, and otherwise sets quitting intention $Q_T=1$ if the entity has quit the organization. Then, after initializing the initial and final quitting-intention values 516.1 and 516.n, the system performs Gibbs sampling to compute quitting intention values for the remaining time intervals by iterating through t∈[2,T−1], and sampling the quitting intention values $Q(u)_t$ from the distribution:

$$p(Q_i|Q_{i-1},Q_{i+1},f) \quad (1)$$

Note that equation (1) provides a Markovian distribution. Breaking up the Markovian distribution of equation (1) provides:

$$Q_i \propto p(Q_i|Q_{i-1},\epsilon^2) \cdot p(Q_{i+1}|Q_i,\epsilon^2) \cdot \Pi_{j=1}^{F} p(f_i^j|Q_i,\mu^j,\lambda^j,\Sigma^j) \quad (2)$$

Also note that equation (2) cannot be manipulated to solve for $Q_i$, as the probabilistic distributions in the right-hand side of equation (2) themselves depend on $Q_i$. In some embodiments, quitting-intention estimating module 508 samples quitting intention $Q_i$ by iteratively adjusting the value of $Q_i$ on the right-hand side and the left-hand side of equation (2) to reach a stable solution (e.g., during operation 6 of Table 1). For example, the system can iteratively solve for $Q_i$ by using a computational mathematics technique, such as using the Just Another Gibbs Sampler (JAGS) package.

TABLE 2

Exemplary Pseudocode for Estimating an Entity's Quitting Intention
Algorithm 1 Gibbs sampling for inference on Q values

```
Require: ∈², μ, λ, Σ
Ensure: Q₀ = 0, Q_T = 1 if user quited or 0 otherwise
1: for i = 2 to T − 1 do
2:       Q_i = 0.5                        ▷ Initialization
3: end for
4: for k = 1 to maxiter do
5:       for i = 2 to T − 1 do
6:            Sample Q_i ∝ p(Q_i|Q_{i−1}, ∈²) · p(Q_{i+1}|Q_i, ∈²) ·
                  Π_{j=1}^F p(f_i^j|Q_i, μ^j, λ^j, Σ^j)
7:       end for
8: end for
9: return (Q₁, Q₂, . . . , Q_T)
```

Table 2 presents exemplary pseudocode for estimating an entity's quitting intention, Q, for a recent time interval T, in accordance with an embodiment. Operations 1-3 initialize the quitting-intention values to an initial value of $Q_i=0.5$, the median of the range Q[0,1]. Operation 4 iterates through a set of k entities being investigated, and operations 5-7 sample the quitting intention values for each entities time of employment (e.g., time intervals t∈[2,T−1]).

Training the Quitting-Intention Model

Figure 6:
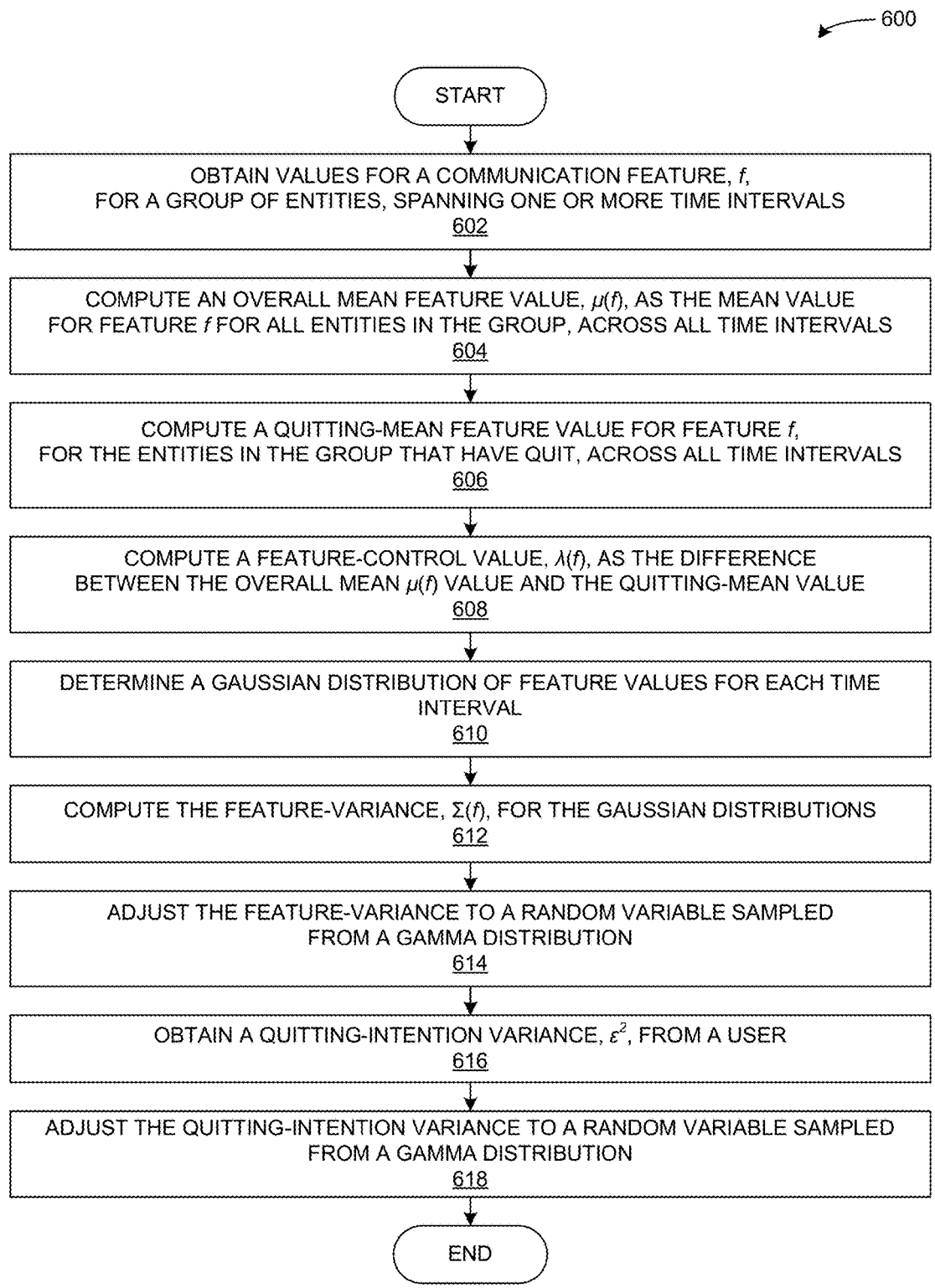
FIG. 6 presents a flow chart illustrating a method for computing parameter values for the quitting-intention estimating model in accordance with an embodiment.

FIG. 6 presents a flow chart illustrating a method 600 for computing parameter values for the quitting-intention estimating model in accordance with an embodiment. These parameters include the mean-feature value μ(f), the feature-control value λ(f), a feature variance Σ(f), and a quitting-intention variance $\epsilon^2$.

During operation, the system obtains feature values for an entity-communication feature, f, such that these feature values correspond to a group of entities that have belonged to an organization, and span one or more time intervals (operation 602). The system then computes the overall mean-feature value, μ(f), as the mean value for feature f, based on the obtained feature values for all entities in the group (operation 604). The mean-feature value indicates a mean value for feature f, across a set of entities that have belonged to an organization.

The system also computes a quitting-mean feature value for feature f, using feature values for entities in the group that have quit the organization (operation 606). The system then computes the feature-control value, λ(f), as the difference between the overall mean μ(f) and the quitting-mean value (operation 608). In some embodiments, the mean-feature value and the quitting-mean value are both computed using feature values obtained over the same sequence of time intervals to maximize the accuracy of the feature-control value. This feature-control value indicates an amount by which the entity's intention to quit affects the entity's feature value for feature f. The system uses the feature-control value, λ(f), as a weight for controlling an amount by which an entity's change in value for feature f should affect the entity's overall quitting-intention score.

The system also computes the feature-variance Σ(f), which indicates amount by which a feature value is expected to vary across different entities. To compute the feature-variance $\Sigma(f)$, the system determines a Gaussian distribution of feature values for each entity, such that each Gaussian distribution is computed for the entity's feature values across the plurality of time intervals (operation 610). The system then computes the variance for the mean values across the Gaussian distributions for the plurality of entities (operation 612), and adjusts the variance to follow a Gamma distribution (operation 614). The system can adjust the feature-variance value, for example, by adjusting the value to a random variable sampled from the Gamma distribution.

In some embodiments, the system obtains the quitting-intention variance, $\epsilon^2$, from a user, such as a system administrator (operation 616). The quitting-intention variance indicates a variance for the quitting intention values across a different time intervals. For example, the system can present a parameter-configuring user interface to a user to obtain the quitting-intention variance, or can read the quitting-intention variance from a parameter-configuration file that has been created or modified by the user. The system then adjusts the quitting-intention variance to follow a Gamma distribution (operation 618).

Figure 7:
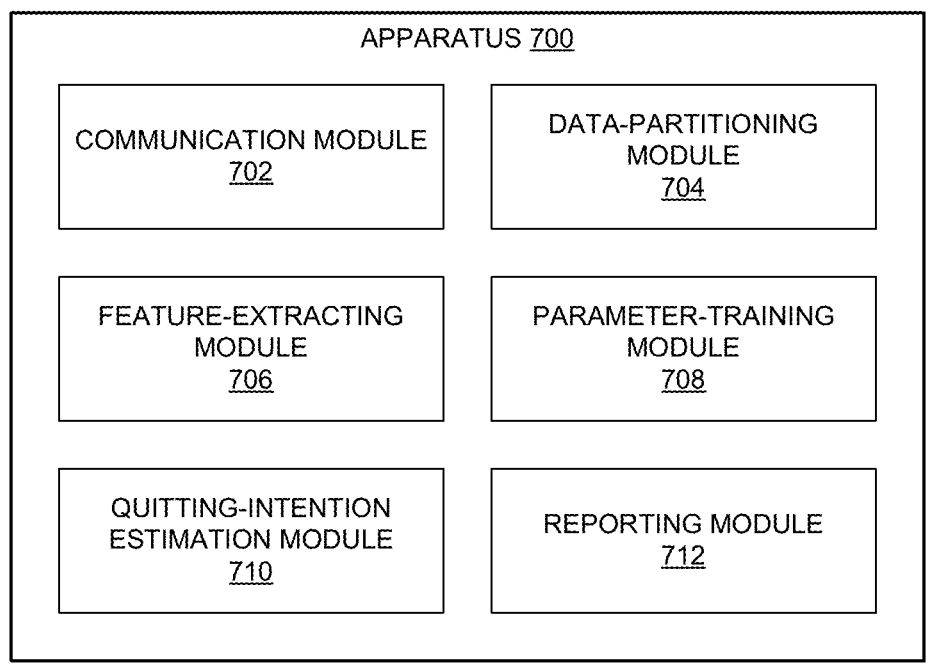
FIG. 7 illustrates an exemplary apparatus that facilitates estimating a quitting intention for a member of an organization in accordance with an embodiment.

FIG. 7 illustrates an exemplary apparatus 700 that facilitates estimating a quitting intention for a member of an organization in accordance with an embodiment. Apparatus 700 can comprise a plurality of modules that may communicate with one another via a wired or wireless communication channel. Apparatus 700 may be realized using one or more integrated circuits, and may include fewer or more modules than those shown in FIG. 7. Further, apparatus 700 may be integrated in a computer system, or realized as a separate device that is capable of communicating with other computer systems and/or devices. Specifically, apparatus 700 can comprise a communication module 702, a data-partitioning module 704, a feature-extracting module 706, a parameter-training module 708, a quitting-intention estimating module 710, and a reporting module 712.

In some embodiments, communication module 702 can communicate with one or more application servers and content repositories to obtain entities' electronic-communication information. Data-partitioning module 704 can partition the electronic-communication information into a set of entities, and to a set of time intervals for each entity. Feature-extracting module 706 can extract feature values, for a set of feature models, from electronic-communication information for a respective entity.

Parameter-training module 708 can train a set of parameters for a quitting-intention estimating model, and quitting-intention estimating module 710 can compute a quitting intention score for a respective entity, based on the trained parameters. Reporting module 712 can report quitting-intention scores for a set of entities to a user, such as a supervisor or administrator.

Figure 8:
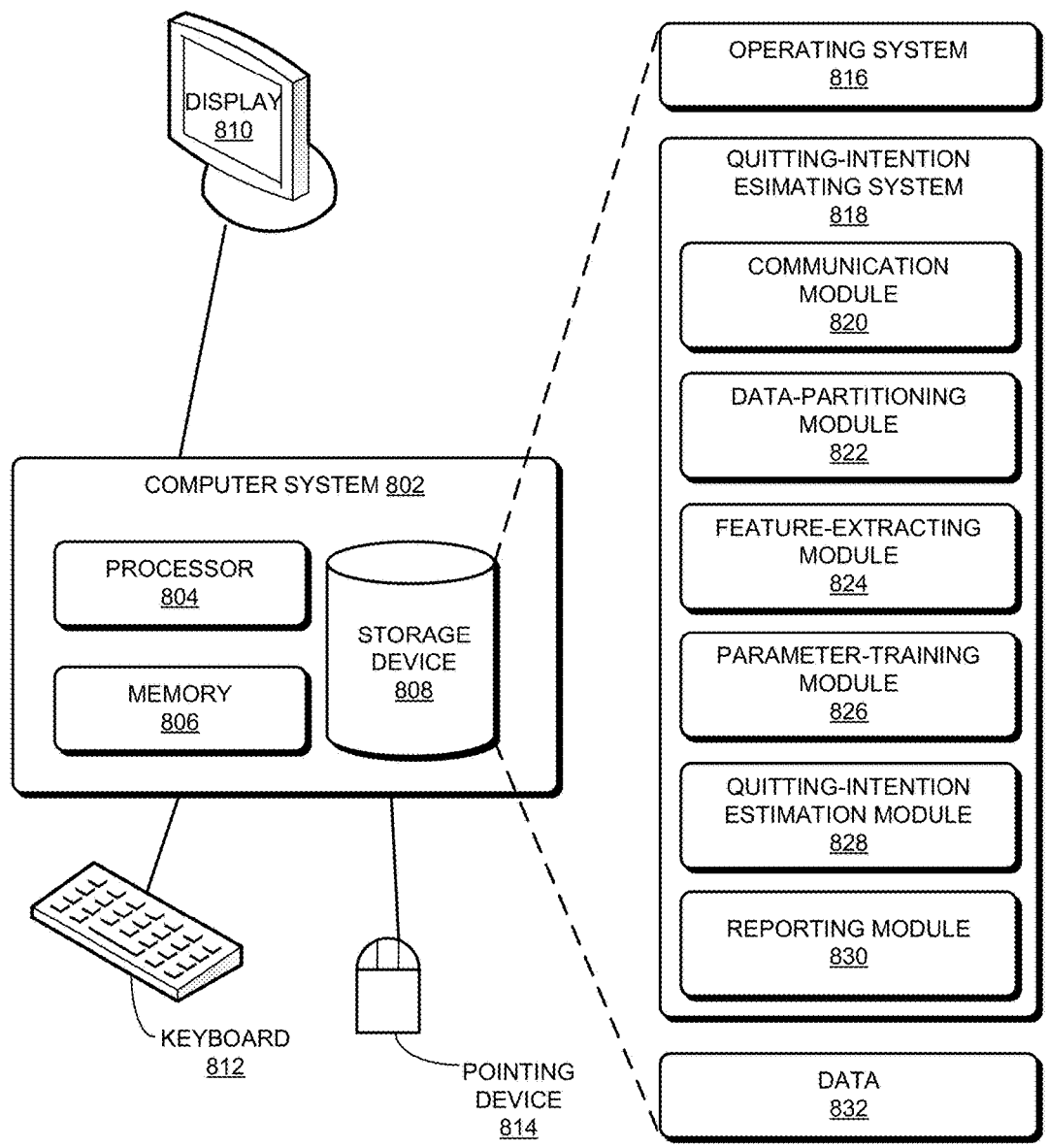
FIG. 8 illustrates an exemplary computer system that facilitates estimating a quitting intention for a member of an organization in accordance with an embodiment.

FIG. 8 illustrates an exemplary computer system 800 that facilitates estimating a quitting intention for a member of an organization in accordance with an embodiment. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store operating system 816, quitting-intention estimating system 818, and data 832.

Quitting-intention estimating system 818 can include instructions, which when executed by computer system 802, can cause computer system 802 to perform methods and/or processes described in this disclosure. Specifically, quitting-intention estimating system 818 may include instructions for communicating with one or more application servers and content repositories to obtain entities' electronic-communication information (communication module 820). Further, quitting-intention estimating system 818 can include instructions for partitioning the electronic-communication information into a set of entities, and to a set of time intervals for each entity (data-partitioning module 822). Quitting-intention estimating system 818 can also include instructions for extracting feature values, for a set of feature models, from electronic-communication information for a respective entity (feature-extracting module 824).

Quitting-intention estimating system 818 may include instructions for training a set of parameters for a quitting-intention estimating model (parameter-training module 826), and can include instructions for computing a quitting intention score for a respective entity, based on the trained parameters (quitting-intention estimating module 828). Quitting-intention estimating system 818 can also include instructions for reporting quitting-intention scores for a set of entities to a user, such as a supervisor or administrator (reporting module 830).

Data 832 can include any data that is required as input or that is generated as output by the methods and/or processes described in this disclosure. Specifically, data 832 can store at least electronic-communication information, feature-extraction models, entity-communication features, and trained parameters for a quitting-intention model.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, performed by a message server comprising a processor, for detecting an entity's intention to quit an organization, the method comprising the steps of:

obtaining recent electronic-communication information for the entity, wherein the entity comprises at least one person;

extracting, from the obtained information, a plurality of recent communication features comprising a sentiment of the entity, word statistics, and a pre-determined pattern indicating a writing style of the entity;

training a quitting intention model based on a feature-control value:
wherein the feature-control value indicates a difference of a mean value for a respective recent communication feature for a quitting group and a mean for the same feature for an overall group comprising current and previous employees;
wherein the model includes a model weight proportional to the difference of means for the respective feature; and
wherein training further comprises adjusting a variance for the means, across a plurality of time intervals, to follow a gamma distribution;

detecting a change over time intervals in a behavior from earlier features;

computing a quitting-intention value for the entity, using the model weight and based on the detected change, wherein the quitting-intention value indicates a likelihood that the change corresponds to an intention to quit the organization; and presenting, on a display, the quitting-intention value for an end user.

2. The method of claim 1, wherein the entity under investigation includes one or more of:
an employee of the organization;
a group of employees within the organization; and
a department within the organization.

3. The method of claim 1, wherein the quitting-intention model performs Gibbs sampling on a Markov process to compute the quitting intention, $Q_t$ and has the form:

$$Q_t \propto p(Q_t|Q_{t-1}, Q_{t+1}, f);$$

wherein t indicates a recent time interval associated with the recent communication features, t−1 indicates a preceding time interval associated with previous communication features, f indicates the recent communication features, and $Q_{t-1}$, indicates a quitting-intention value for the preceding time interval.

4. The method of claim 1, wherein training the quitting intention model further comprises training one or more parameters of the quitting-intention model based on electronic-communication information associated with the quitting and overall groups.

5. The method of claim 4, wherein the one or more parameters includes the mean value, $\mu$, corresponding to the overall group; and
wherein training the one or more parameters involves:
determining feature values for a communication feature, for the overall group of entities that have belonged to the organization, associated with the plurality of time intervals; and
computing the mean value, $\mu$, for the communication feature, as a mean of the determined feature values for the overall group.

6. The method of claim 5, wherein the one or more parameters includes the feature-control value, $\lambda$; and
wherein training the one or more parameters involves:
determining feature values for the communication feature, for the quitting group of entities that have quit the organization, for the plurality of time intervals;
computing a mean for the determined feature values for the quitting group; and
computing the feature-control value, $\lambda$, for the communication feature, as the difference between the mean values for the overall and quitting groups.

7. The method of claim 5, wherein the one or more parameters includes a feature-variance value, $\Sigma$, which indicates a magnitude by which feature values for the communication feature are expected to vary from the mean value $\mu$.

8. A non-transitory computer-readable storage medium storing instructions that when executed by a message server cause the message server to perform a method for detecting an entity's intention to quit an organization, the method comprising:

obtaining, from a storage device associated to the message server, recent electronic-communication information for the entity, wherein the entity comprises at least one person;

extracting, from the obtained information, a plurality of recent communication features, comprising a sentiment of the entity, word statistics, and a pre-determined pattern indicating a writing style of the entity;

training a quitting intention model based on a feature-control value:
wherein the feature-control value indicates a difference of a mean value for a respective recent communication feature for a quitting group and a mean for the same feature for an overall group comprising current and previous employees;
wherein the model includes a model weight proportional to the difference of means for the respective feature; and
wherein training further comprises adjusting a variance for the means, across a plurality of time intervals, to follow a gamma distribution;

detecting a change over time intervals in a behavior from earlier features;

computing a quitting-intention value for the entity, using the model weight and based on the detected change, wherein the quitting-intention value indicates a likelihood that the change corresponds to an intention to quit the organization; and presenting, on a display, the quitting-intention value for an end user.

9. The storage medium of claim 8, wherein the entity under investigation includes one or more of:
an employee of the organization;
a group of employees within the organization; and
a department within the organization.

10. The storage medium of claim 8, wherein the quitting-intention model performs Gibbs sampling on a Markov process to compute the quitting intention, $Q_t$, and has the form:

$$Q_t \propto p(Q_t|Q_{t-1},Q_{t+1},f);$$

wherein t indicates a recent time interval associated with the recent communication features, t−1 indicates a preceding time interval associated with previous communication features, f indicates the recent communication features, and $Q_{t-}$ indicates a quitting-intention value for the preceding time interval.

11. The storage medium of claim 8, wherein training the quitting intention model further comprises training one or more parameters of the quitting-intention model based on electronic-communication information associated with the quitting and overall groups.

12. The storage medium of claim 11, wherein the one or more parameters includes the mean value, $\mu$, corresponding to the overall group; and
wherein training the one or more parameters involves:
determining feature values for a communication feature, for the overall group of entities that have belonged to the organization, for the associated with the plurality of time intervals; and
computing the mean value, $\mu$, for the communication feature, as a mean of the determined feature values for the overall group.

13. The storage medium of claim 12, wherein the one or more parameters includes the feature-control value, $\lambda$; and
wherein training the one or more parameters involves:
determining feature values for the communication feature, for the quitting group of entities that have quit the organization, for the plurality of time intervals;
computing a mean for the determined feature values for the quitting group; and
computing the feature-control value, $\lambda$, for the communication feature, as the difference between the mean values for the overall and quitting groups.

14. The storage medium of claim 12, wherein the one or more parameters includes a feature-variance value, $\Sigma$, which indicates a magnitude by which feature values for the communication feature are expected to vary from the mean value $\mu$.

15. An apparatus for detecting an entity's intention to quit an organization, comprising:
a message server computer comprising a processor;
an associated storage device that stores electronic-communication information for a plurality of users;
a display that presents a quitting-intention value for an end user; and
a memory storing instructions that, when executed by the processor, cause the message server computer to implement:
a data-obtaining module that obtains, from the storage device associated to the message server computer, recent electronic-communication information associated with the entity under investigation, wherein the entity comprises at least one person;
a feature-extracting module that extracts, from the obtained information, a plurality of recent communication features, comprising a sentiment of the entity, word statistics, and a pre-determined pattern indicating a writing style of the entity;
a model-training module that trains a quitting intention model based on a feature-control value:
wherein the feature-control value indicates a difference of a mean value for a respective recent communication feature for a quitting group and a mean for the same feature for an overall group comprising current and previous employees;
wherein the model includes a model weight proportional to the difference of means for the respective feature; and
wherein training further comprises adjusting a variance for the means, across a plurality of time intervals, to follow a gamma distribution;
a change-detecting module that detects a change over time intervals in a behavior from earlier features; and
a quitting-intention estimating module that computes a quitting-intention value for the entity, using the model weight and based on the detected change, wherein the quitting-intention value indicates a likelihood that the change corresponds to an intention to quit the organization.

16. The apparatus of claim 15, wherein the quitting-intention model performs Gibbs sampling on a Markov process to compute the quitting intention, $Q_t$, and has the form:

$$Q_t \propto p(Q_t|Q_{t-1},Q_{t+1},f);$$

wherein t indicates a recent time interval associated with the recent communication features, t−1 indicates a preceding time interval associated with previous communication features, f indicates the recent communication features, and $Q_{t-1}$, indicates a quitting-intention value for the preceding time interval.

17. The apparatus of claim 15, wherein the model-training module further:
trains one or more parameters of the quitting-intention model based on electronic-communication information associated with the quitting and overall groups.

18. The apparatus of claim 17, wherein the one or more parameters includes the mean value, $\mu$, corresponding to the overall group; and
wherein while training the one or more parameters, the model-training module is further configured to:
determine feature values for a communication feature, for the overall group of entities that have belonged to the organization, associated with the plurality of time intervals; and
compute the mean value, $\mu$, for the communication feature, as a mean of the determined feature values for the overall group.

19. The apparatus of claim 18, wherein the one or more parameters includes the feature-control value, $\lambda$; and
wherein while training the one or more parameters, the model-training module is further configured to:
determine feature values for the communication feature, for the quitting group of entities that have quit the organization, for the plurality of time intervals;
compute a mean for the determined feature values for the quitting group; and
compute the feature-control value, $\lambda$, for the communication feature, as the difference between the mean values for the overall and quitting groups.

20. The method of claim 1, wherein the pre-determined pattern indicating a writing style of the entity includes one or more of the following:
a writing pattern for a message greeting;
a writing pattern for closing an email message;
a writing pattern including "wishes"; and
a pattern of including emoticons.

21. The method of claim 1, wherein the word statistics further indicate one or more of the following:
a number or frequency of negation usage;
a frequency of pronoun usage; and
a number of rare words.

* * * * *